(12) United States Patent
Eitzman et al.

(10) Patent No.: US 12,070,634 B2
(45) Date of Patent: Aug. 27, 2024

(54) EXHALATION VALVE AND RESPIRATOR INCLUDING SAME

(71) Applicant: 3M INNOVATIVE PROPERTIES COMPANY, St. Paul, MN (US)

(72) Inventors: Philip D. Eitzman, Lake Elmo, MN (US); Thomas J. Xue, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1061 days.

(21) Appl. No.: 16/332,413

(22) PCT Filed: Sep. 12, 2017

(86) PCT No.: PCT/US2017/051066
§ 371 (c)(1),
(2) Date: Mar. 12, 2019

(87) PCT Pub. No.: WO2018/052874
PCT Pub. Date: Mar. 22, 2018

(65) Prior Publication Data
US 2021/0283434 A1 Sep. 16, 2021

Related U.S. Application Data

(60) Provisional application No. 62/395,429, filed on Sep. 16, 2016.

(51) Int. Cl.
*A62B 18/10* (2006.01)
*A41D 13/11* (2006.01)
*F16K 1/226* (2006.01)

(52) U.S. Cl.
CPC .............. *A62B 18/10* (2013.01); *A41D 13/11* (2013.01); *F16K 1/226* (2013.01)

(58) Field of Classification Search
CPC ......... A62B 18/10; A41D 13/11; F16K 1/226; A61M 16/06; A61M 16/047; A61M 16/20;
(Continued)

(56) References Cited

U.S. PATENT DOCUMENTS 1,268,696 A  6/1918 Donald
2,999,498 A  9/1961 Matheson
(Continued)

FOREIGN PATENT DOCUMENTS

CN  202751705  2/2013
CN  104147719  11/2014
(Continued)

OTHER PUBLICATIONS

International Application PCT/US2017/051066 Search Report Dated Nov. 22, 2017.

*Primary Examiner* — Caitlin A Carreiro

(57) ABSTRACT

Various embodiments of an exhalation valve and a filtering face mask that includes such exhalation valve are disclosed. The exhalation valve can include a valve seat and a valve flap disposed over a seal surface and an orifice of the valve seat. The valve flap is adapted to be sealed against the seal surface of the valve seat when the exhalation valve is disposed in a closed configuration such that fluid is prevented from flowing through the valve seat. The orifice of the valve seat can include a substantially circular shape in a plane defined by a first major surface of the valve seat. Further, the seal surface can circumscribe the orifice and can include a substantially noncircular shape in the plane defined by the first major surface of the valve seat.

18 Claims, 6 Drawing Sheets

(58) Field of Classification Search
CPC .............. A61M 16/201; A61M 16/208; A61M 16/0468
USPC .............. 128/857, 863, 868, 206.12, 206.21, 128/207.12, 207.16
See application file for complete search history.

(56) References Cited

U.S. PATENT DOCUMENTS

| | | | |
|---|---|---|---|
| 3,474,783 | A | 10/1969 | Ulmann |
| 4,414,973 | A | 11/1983 | Matheson |
| 4,630,862 | A | 12/1986 | Watanabe |
| 4,749,003 | A | 6/1988 | Leason |
| 4,838,262 | A | 6/1989 | Katz |
| 4,934,362 | A | 6/1990 | Braun |
| 4,958,633 | A | 9/1990 | Angell |
| 4,974,586 | A | 12/1990 | Wandel |
| 4,981,134 | A | 1/1991 | Courtney |
| 5,331,957 | A | 7/1994 | Liu |
| 5,687,767 | A * | 11/1997 | Bowers ................ F16K 15/16 128/205.24 |
| 6,047,698 | A | 4/2000 | Magidson |
| 6,834,649 | B1 * | 12/2004 | Kuo ..................... B63C 11/12 128/205.24 |
| 6,843,248 | B2 | 1/2005 | Japuntich |
| 7,007,695 | B2 | 3/2006 | Curran |
| 7,013,895 | B2 | 3/2006 | Martin |
| 7,013,985 | B2 | 3/2006 | Sasaki |
| 7,028,689 | B2 | 4/2006 | Martin |
| 7,069,931 | B2 | 4/2006 | Curran |
| 7,188,622 | B2 | 3/2007 | Martin |
| 7,503,326 | B2 | 3/2009 | Martin |
| 7,686,018 | B2 | 3/2010 | Cerbini |
| 7,958,889 | B1 | 6/2011 | Fernandez-Decastro |
| 8,757,156 | B2 | 6/2014 | Martin et al. |
| D827,812 | S | 9/2018 | Eitzman |
| D828,546 | S | 9/2018 | Eitzman |
| D842,983 | S | 3/2019 | Eitzman |
| D843,562 | S | 3/2019 | Eitzman |
| 2002/0195108 | A1 | 12/2002 | Mittelstadt |
| 2003/0000531 | A1 | 1/2003 | Tuck |
| 2004/0255947 | A1 | 12/2004 | Martin |
| 2004/0261795 | A1 | 12/2004 | Brunell |
| 2005/0155607 | A1 * | 7/2005 | Martin ................ A62B 18/10 128/207.13 |
| 2007/0144524 | A1 | 6/2007 | Martin |
| 2009/0044811 | A1 | 2/2009 | Welchel |
| 2011/0139158 | A1 * | 6/2011 | Xue ..................... A62B 18/10 128/206.15 |
| 2012/0016789 | A1 | 7/2012 | Insley et al. |
| 2012/0167890 | A1 * | 7/2012 | Insley ................. A62B 18/10 29/407.01 |

FOREIGN PATENT DOCUMENTS

| | | |
|---|---|---|
| CN | 203989554 | 12/2014 |
| CN | 204519423 | 8/2015 |
| CN | 205055246 | 3/2016 |
| CN | 105816972 | 8/2016 |
| DE | 4029939 | 3/1992 |
| EP | 1647310 | 8/2007 |
| FR | 2767482 | 2/1999 |
| GB | 825659 | 12/1959 |
| GB | 2304176 | 3/1997 |
| KR | 100912233 | 8/2009 |
| KR | 10-1348238 | 1/2014 |
| RU | 154233 | 8/2015 |
| WO | WO 2004/112906 | 12/2004 |
| WO | WO 2009/029349 | 3/2009 |
| WO | WO 2011/026515 | 3/2011 |
| WO | WO 2015-009679 | 1/2015 |
| WO | WO 2015/1833177 | 12/2015 |

* cited by examiner

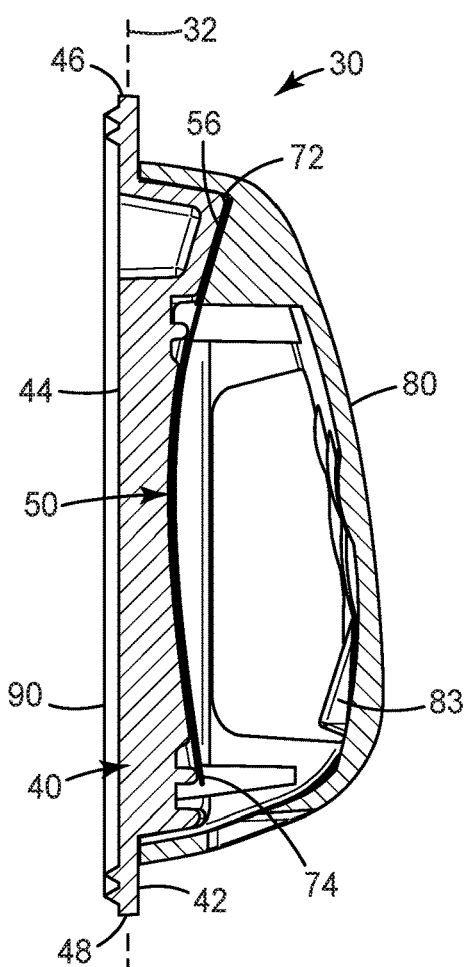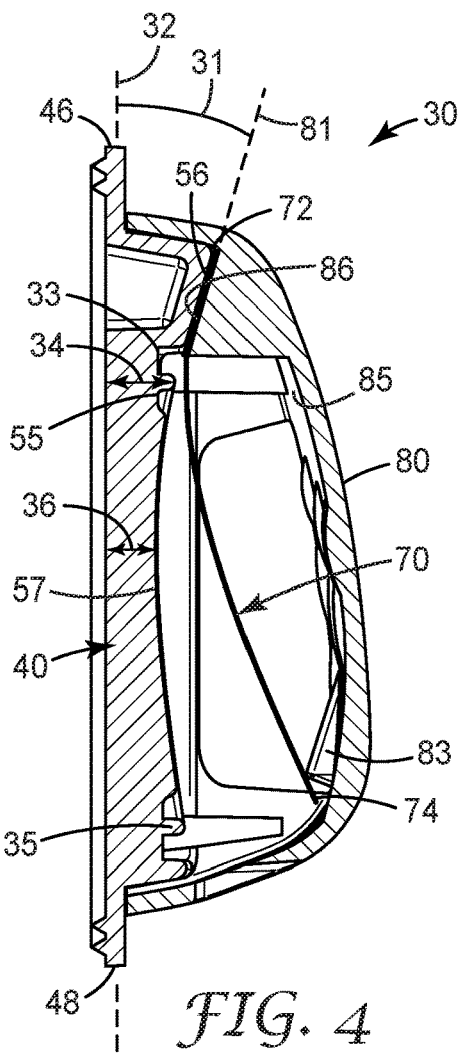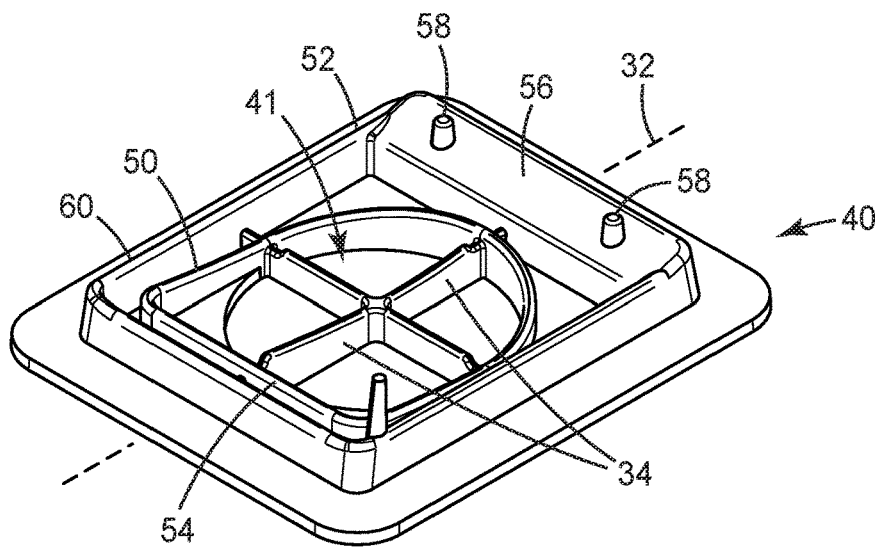

EXHALATION VALVE AND RESPIRATOR INCLUDING SAME

CROSS REFERENCE TO RELATED APPLICATIONS

This application is a national stage filing under 35 U.S.C. 371 of PCT/US2017/051066, filed Sep. 12, 2017, which claims the benefit of U.S. Provisional Application No. 62/395,429, filed Sep. 16, 2016, the disclosure of which is incorporated by reference in its/their entirety herein.

BACKGROUND

Persons who work in polluted environments commonly wear filtering face masks to protect themselves from inhaling airborne contaminants. Such filtering face masks typically have a fibrous or sorbent filter that is capable of removing particulate and/or gaseous contaminants from the air. When wearing face masks in a contaminated environment, wearers are comforted with the knowledge that they are breathing filter air, but they can, however, be contemporaneously discomforted by the warm, moist, exhaled air that accumulates around their faces.

To improve comfort, manufacturers of filtering face masks often install an exhalation valve on a mask body of the face mask to allow the warm, moist, exhaled air to be rapidly purged from an interior of the mask. The rapid removal of the exhaled air can make the mask interior cooler and help prevent build-up of moisture within the mask.

Commercial manufacturers of respiratory masks have installed "button-style" exhalation valves on the masks to enable exhaled air to be purged from the interior of the masks. The button-style valves typically have employed a thin circular flexible flap as the dynamic mechanical element that lets exhaled air escape from the mask interior. The flap is centrally mounted to a valve seat through a central post. Examples of button-style valves are described, e.g., in U.S. Pat. Nos. 2,072,516; 2,230,770; 2,895,472; and 4,630,604. When a person exhales, a circumferential portion of the flap is lifted from the valve seat to allow air to escape from the mask interior.

Button-style valves have represented an advance in the attempt to improve wearer comfort, but investigators have made other improvements, one example of which is described in U.S. Pat. No. 4,934,362 to Braun. The valve described in this patent uses a parabolic valve seat and an elongated flexible flap. Like the button-style valve, the Braun valve also has a centrally-mounted flap that includes a flap edge portion that lifts from a seal surface during an exhalation to allow the exhaled air to escape from the mask interior.

After the Braun development, another innovation was made in the exhalation valve art by Japuntich et al. See, e.g., U.S. Pat. Nos. 5,325,892; and 5,509,436. The Japuntich et al. valve uses a single flexible flap that is mounted off-center in cantilevered fashion to minimize the exhalation pressure that is required to open the valve. When the valve-opening pressure is minimized, less power is required to operate the valve, which means that the wearer does not need to work as hard to expel exhaled air from the mask interior when breathing.

Other valves that have been introduced after the Japuntich et al. valve also have used a non-centrally mounted cantilevered flexible flap. See, e.g., U.S. Pat. Nos. 5,687,767 and 6,047,698. Valves that have this kind of construction are sometimes referred to as "flapper-style" exhalation valves.

SUMMARY

In general, the present disclosure provides various embodiments of an exhalation valve and a filtering face mask that includes such exhalation valve. The exhalation valve can include a valve seat that includes a seal surface and a substantially circular orifice, and a valve flap disposed over the seal surface and the substantially circular orifice. In one or more embodiments, the seal surface circumscribes the orifice and includes a substantially noncircular shape in a plane defined by a first major surface of the valve seat. Further, in one or more embodiments, an area enclosed by the seal surface can be greater than an area enclosed by the orifice.

In one aspect, the present disclosure provides an exhalation valve. The valve includes a valve seat including a first major surface, a second major surface, an orifice disposed between the first and second major surfaces of the valve seat, and a valve seat axis extending between a first end and a second end of the valve seat. The orifice includes a substantially circular shape in a plane defined by the first major surface of the valve seat. The valve seat further includes a seal surface and a flap retaining surface each disposed on the first major surface of the valve seat, where the seal surface circumscribes the orifice and includes a substantially noncircular shape in the plane defined by the first major surface of the valve seat. The exhalation valve further includes a valve flap disposed over the seal surface and the orifice, wherein the valve flap includes a first end connected to the flap retaining surface. The valve flap is adapted to be sealed against the seal surface of the valve seat when the exhalation valve is disposed in a closed configuration such that fluid is prevented from flowing through the valve seat. A second end of the valve flap is adapted to be spaced apart from the seal surface when the exhalation valve is disposed in an open configuration such that fluid can flow through the valve seat. The valve flap includes a curved shape in a plane orthogonal to the first major surface of the valve seat when the exhalation valve is disposed in the closed configuration.

In another aspect, the present disclosure provides a filtering face mask. The filtering face mask includes a mask body adapted to fit at least over the nose and mouth of a wearer to form an interior gas space when worn. The face mask also includes an exhalation valve that is in fluid communication with the interior gas space of the face mask. The exhalation valve includes a valve seat including a first major surface, a second major surface, an orifice disposed between the first and second major surfaces of the valve seat, and a valve seat axis extending between a first end and a second end of the valve seat. The orifice includes a substantially circular shape in a plane defined by the first major surface of the valve seat. The valve seat further includes a seal surface and a flap retaining surface each disposed on the first major surface of the valve seat, where the seal surface circumscribes the orifice and includes a substantially noncircular shape in the plane defined by the first major surface of the valve seat. The exhalation valve further includes a valve flap disposed over the seal surface and the orifice, where the valve flap includes a first end connected to the flap retaining surface. The valve flap is adapted to be sealed against the seal surface of the valve seat when the exhalation valve is disposed in a closed configuration such that fluid is prevented from flowing through the valve seat. A second end of the valve flap is adapted to be spaced apart from the seal surface when the exhalation valve is disposed in an open configuration such that fluid can flow through the valve seat. The valve flap includes a curved shape in a plane orthogonal to the first major surface of the valve seat when the exhalation valve is disposed in the closed configuration.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

Glossary

The terms used to describe the various embodiments described herein will have the following meanings:

"closed configuration" means the position where the valve flap is in full contact with the seal surface such that fluid cannot flow through the valve seat;

"contaminants" mean particles and/or other substances that generally may not be considered to be particles (e.g., organic vapors, etc.) but may be suspended in air;

"exhaled air" is air that is exhaled by a filtering face mask wearer;

"exhale flow stream" means the stream of fluid that passes through the orifice of the exhalation valve during an exhalation;

"exhalation valve" means a valve that is adapted for use on a filtering face mask to allow a fluid to exit a filtering face mask's interior gas space when the valve is operatively disposed on or through the mask;

"exterior gas space" means the ambient atmospheric gas space into which exhaled gas enters after passing through and beyond the exhalation valve;

"filtered air" means a volume of air or oxygen that has been filtered or cleansed to remove or reduce contaminants;

"filtering face mask" means a respiratory protection device (including half and full face masks and hoods) that covers at least the nose and mouth of the wearer and that is capable of supplying filtered air to the wearer;

"flexible flap" means a sheet-like article that is capable of bending or flexing in response to a force exerted from a moving fluid, which moving fluid, in the case of an exhalation valve, would be an exhale flow stream and in the case of an inhalation valve would be an inhale flow stream;

"fluid communication" means that the exhale flow stream can flow from the interior gas space of the filtering face mask through an orifice of the exhalation valve when the valve is in an open configuration;

"inhale filter element" means a fluid-permeable structure through which air passes before being inhaled by the wearer of a filtering face mask so that contaminants and/or particles can be removed therefrom;

"inhale flow stream" means the stream of air or oxygen that passes through an orifice of an inhalation valve during an inhalation;

"inhalation valve" means a valve that opens to allow a fluid to enter a filtering face mask's interior gas space;

"interior gas space" means the space between a mask body and a wearer's face;

"mask body" means a structure that can fit at least over the nose and mouth of the wearer and that helps define an interior gas space separated from an exterior gas space;

"particles" mean any liquid and/or solid substance that is capable of being suspended in air, for example, pathogens, bacteria, viruses, mucous, saliva, blood, etc.;

"seal surface" means a surface that makes contact with the valve flap when the valve is in its closed configuration; and "unidirectional fluid valve" means a valve that allows a fluid to pass through it in one direction but not the other.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein:

FIG. 3 is a schematic cross-section view of the exhalation valve of FIG. 1 with the exhalation valve disposed in a closed configuration.

FIG. 4 is a schematic cross-section view of the exhalation valve of FIG. 1 with the exhalation valve disposed in an open configuration.

FIG. 5 is a schematic perspective view of a valve seat of the exhalation valve of FIG. 1.

DETAILED DESCRIPTION

Figure 1:
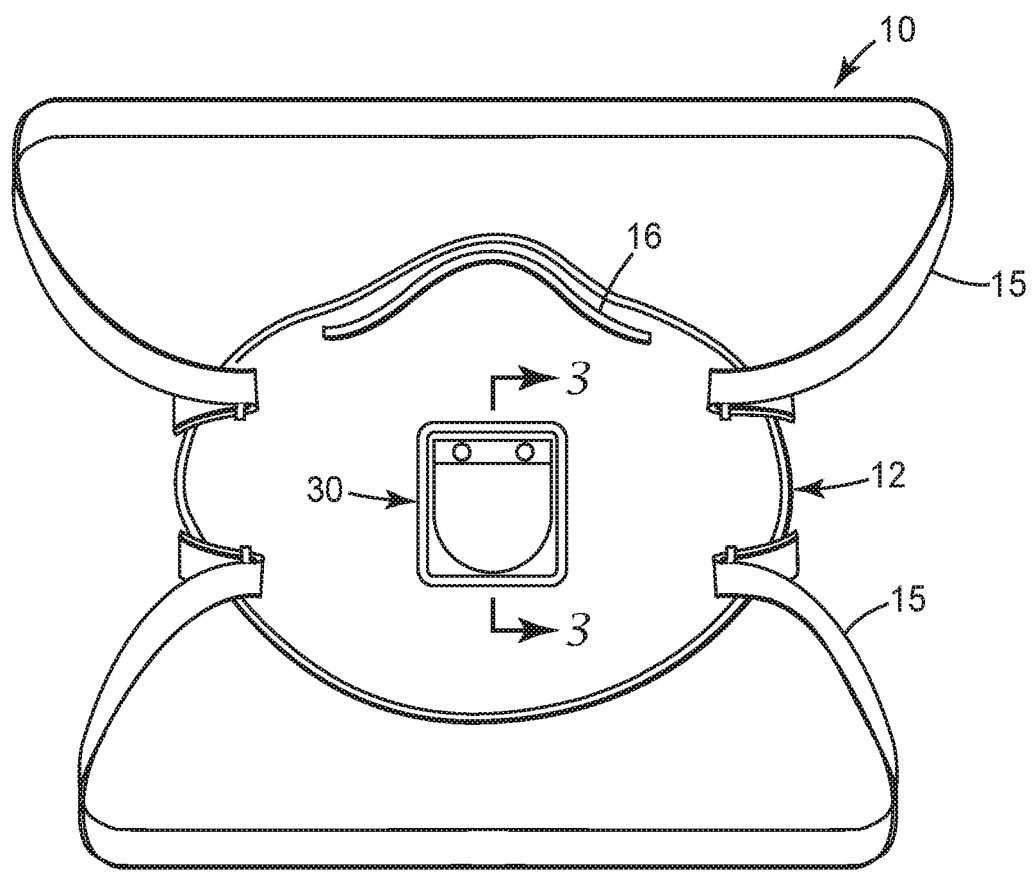
FIG. 1 is a schematic perspective view of one embodiment of a filtering face mask that includes an exhalation valve.

In general, the present disclosure provides various embodiments of an exhalation valve and a filtering face mask that includes such exhalation valve. The exhalation valve can include a valve seat that includes a seal surface and a substantially circular orifice, and a valve flap disposed over the seal surface and the substantially circular orifice. In one or more embodiments, the seal surface circumscribes the orifice and includes a substantially noncircular shape in a plane defined by a first major surface of the valve seat. Further, in one or more embodiments, an area enclosed by the seal surface can be greater than an area enclosed by the orifice.

In one or more embodiments, an area enclosed by the seal surface is greater than an area enclosed by the orifice. This greater area along with a noncircular shape of the seal surface can, in one or more embodiments, minimize a pressure differential required to open the exhalation valve and to maximize flow of fluid through the valve during exhalation. Further, in one or more embodiments, the seal surface can be non-coplanar with a plane parallel to a first major surface of the valve seat. This three-dimensional shape of the seal surface can be designed to provide sufficient force for pressing the valve flap against the seal surface such that the valve remains closed when no flow of fluid occurs and when the exhibition valve is in any orientation.

Further, the seal surface of the various embodiments of exhalation valves described herein can extend further from a fixed end of a cantilevered valve flap than a perimeter of the orifice. In one or more embodiments, the further the seal surface extends from the fixed end of the valve flap, the greater the moment arm of force of exhaled air flow that acts on the valve flap. This greater moment arm can result in a lower opening differential pressure. In one or more embodiments, such configurations can result in higher flow of fluid once the valve opens. Further, in one or more embodiments, the shape of a portion of the seal surface spaced furthest apart from the fixed end of the valve flap can include straight portions that can also increase the moment arm of the valve flap by maximizing the amount of seal surface that is most distant from the fixed end of the valve flap.

In one or more embodiments, the orifice can include a round shape the may be beneficial when manufacturing respirators that include the described exhalation valves. For example, a round orifice can aid in positioning the valve on the respirator as slight angular deviations between the valve and the respirator will be less noticeable and may not result in blockage of the flow path. Further, a round orifice can allow the use of a round tool for punching, cutting, and forming of the respirator and, in one or more embodiments, can aid in the attachment of valves to the respirator. Such round tooling may not require any angular alignment during installation and replacement, thereby making maintenance of the tooling more efficient and less prone to error.

One or more embodiments of exhalation valves and face masks that include such valves described herein may improve wearer comfort and concomitantly make it more likely that wearers will continuously wear their masks in contaminated environments. Further, one or more embodiments described herein may improve worker safety and provide long term health benefits to workers and others who wear personal respiratory protection devices by making such devices more comfortable to wear.

There are two primary benefits of including exhalation valves in disposable filtering face masks. First, an exhalation valve can significantly reduce the amount of warm, humid exhaled breath that must leave the face mask through the filter media of the face mask. Second, an exhalation valve can reduce the effort required to exhale through the face mask.

The venting of exhaled breath can increase the comfort of the wearer by reducing the average temperature and humidity inside the face mask. If all of the exhaled breath exits the respirator through the filter media, some of the heat and moisture in the exhaled breath can be stored by filter media of the face mask and then introduced into subsequent inhaled breath. Any heat and moisture in exhaled breath vented directly to the exterior of the face mask will not be stored in the face mask filter media and will not contribute to the warming and humidification of inhaled breath.

The pressure required to exhale through the filter media of the face mask can vary from less than 5 mmH$_2$O to over 20 mmH$_2$O, depending upon breathing rate and the design of the face mask. An exhalation valve can significantly reduce the pressure required to exhale through a face mask by providing an additional flow path for exhaled air.

Exhalation valves utilized in face masks can operate as check valves, opening during exhalation and closing during inhalation. The state of the exhalation valve, i.e., whether it is opened or closed, is determined by the pressure differential between the inside and the outside of the face mask.

To maximize the amount of exhaled air that vents through an exhalation valve, the valve must open at a low applied pressure and provide a lower resistance to flow than the filter media of the face mask. In one or more embodiments, the valve should remain closed in all orientations of the valve when there is no airflow in or through the face mask. To keep the valve closed, a valve flap is typically arranged within the valve to generate a net force that presses the flap against a sealing surface when there is no air flow through the face mask.

Figure 10:
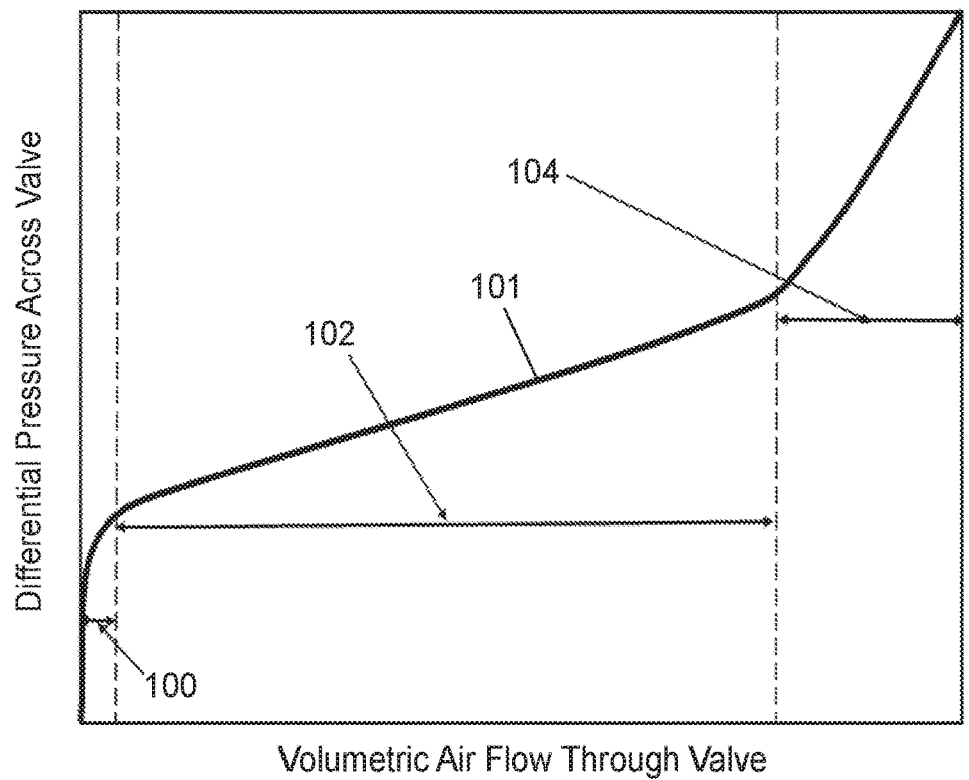
FIG. 10 is a graph of differential pressure across a typical exhalation valve versus volumetric air flow through the valve.

FIG. 10 is a graph of differential pressure across an exemplary exhalation valve versus volumetric air flow through the valve. Curve 101 of the graph shows the typical behavior of differential pressure across the exhalation valve as the flow through the valve varies. The graph is divided into three regions based upon different operating modes of the valve.

In first region 100, a valve flap of the valve has been partially lifted or separated from a sealing surface. This region 100 occurs with low air flow through the valve when the valve flap is primarily supported by the sealing surface.

Second region 102, where the valve flap has fully lifted or separated from the seal surface, occurs with moderate air flow through the valve when the flap is primarily supported by air flow. Parts of the valve flap may also be supported by the seal surface but to a much lesser extent than by the air flow. In this second region 102, the movement of the valve flap away from the seal surface is not constrained by valve body structures such as a valve cap or cover.

Third region 104, where the valve flap has fully lifted or separated from the seal surface and has been fully deflected, occurs with high air flow through the valve when the flap is supported by air flow and its movement away from the seal surface is restricted by valve body structures such as a valve cap or cover.

Figure 11:
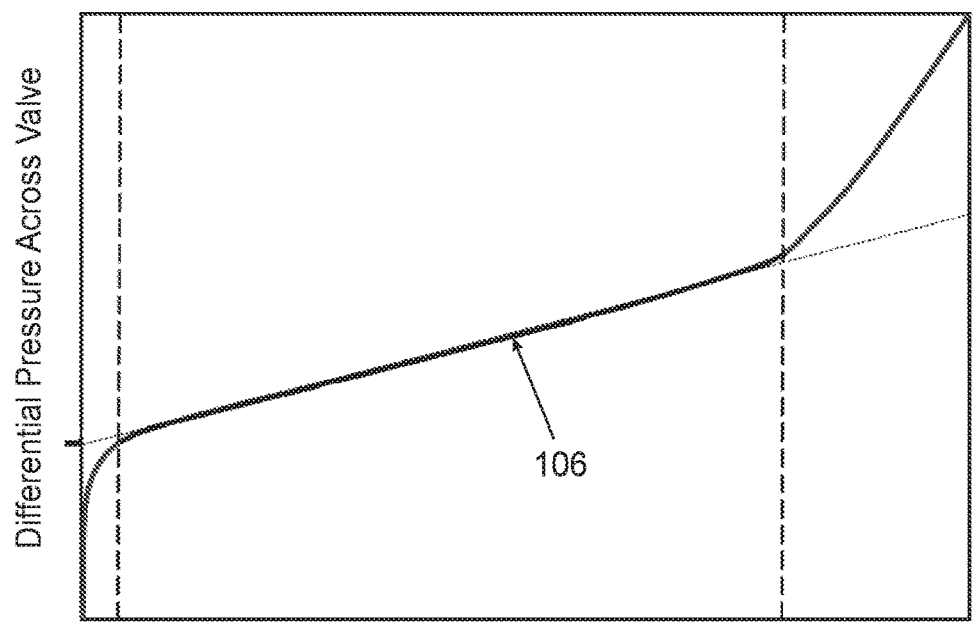
FIG. 11 is the graph of FIG. 10 with a line fitted to a second region of the graph.

For many disposable respirator valves, the shape of the second region 102 of the graph shown in FIG. 10 is roughly linear. In these cases, the second region 102 can be approximated by a straight line 106, as is shown in FIG. 11. This straight line 106 can be defined by an appropriate process such as linear regression. A differential pressure value that corresponds to a point where the fitted straight line 106 intersect the y-axis (i.e., corresponding to a volumetric flow rate of 0) can be thought of as the approximate differential pressure required to lift the valve flap from the seal surface, i.e., the opening differential pressure. A slope of the fitted line 106 corresponds to the linear flow resistance of the exhalation valve. This linear flow resistance can indicate the increase in differential pressure resulting from an increase in flow through the exhalation valve.

In one or more embodiments, respirator exhalation valves should remain closed during inhalation to prevent the leakage of contaminants into the respirator and stay closed when no flow is present and at very low inhalation flow rates. To ensure that the exhalation valve remains closed under "no flow" situations and in all orientations, the valve flap of the exhalation valve can, in one or more embodiments, have a net force pressing it against the seal surface. As a result, the exhalation valve can have a finite opening pressure drop as it may not be desirable to have an exhalation valve with a valve opening pressure drop of zero.

To ensure that the exhalation valve remains closed when a free side of the valve flap (i.e., the side or surface of the flap facing away from the seal surface) is facing downward, the net force keeping the flap pressed against the seal surface should be sufficient to overcome the force of gravity on the flap. As a result, there may be an advantage in some embodiments to using a low-weight valve flap. A low-weight flap can be achieved by using a thin, stiff material such as a polymeric film (see, e.g., U.S. Pat. Nos. 7,503,326 and 7,188,622).

Figure 12:
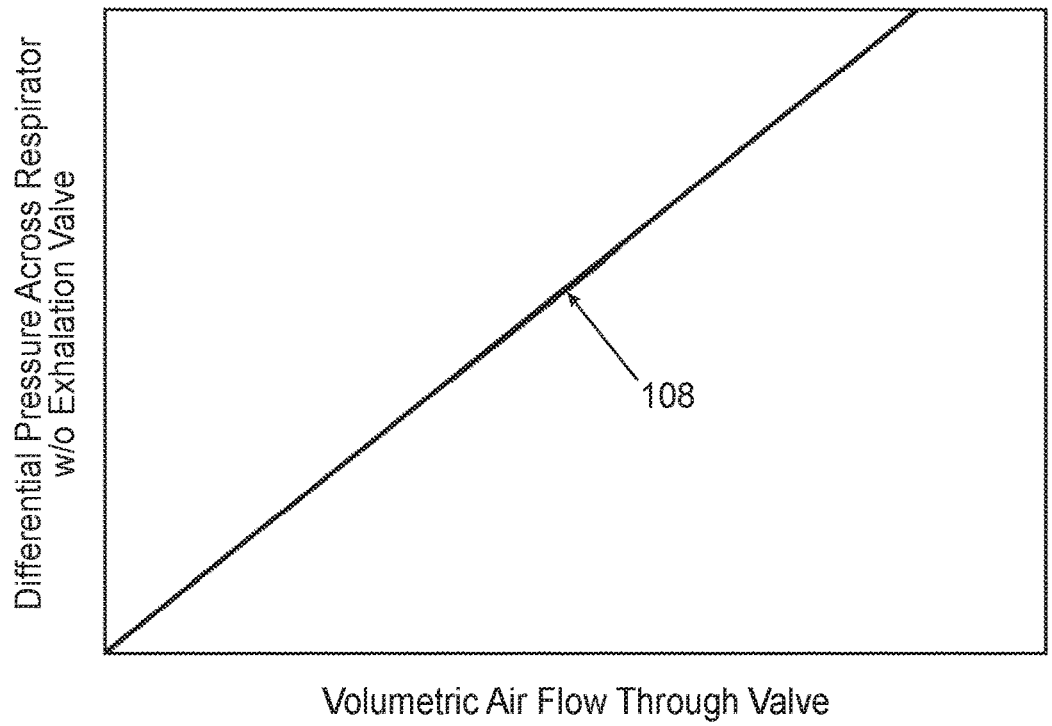
FIG. 12 is a graph of differential pressure across a typical respirator that does not include an exhalation valve versus volumetric air flow through the respirator.

FIG. 12 is a graph that illustrates a typical relationship between differential pressure and flow rate for a typical face mask that does not include an exhalation valve. For the entire range of flow rates that might be experienced in normal use of the face mask, there can be a linear relationship between air flow rate and differential pressure, with a resulting line 108 intersecting the y-axis at the point corresponding to zero flow rate and zero differential pressure. This line 108 represents the linear flow resistance of the filter media and other breathable layers of the face mask.

Figure 13:
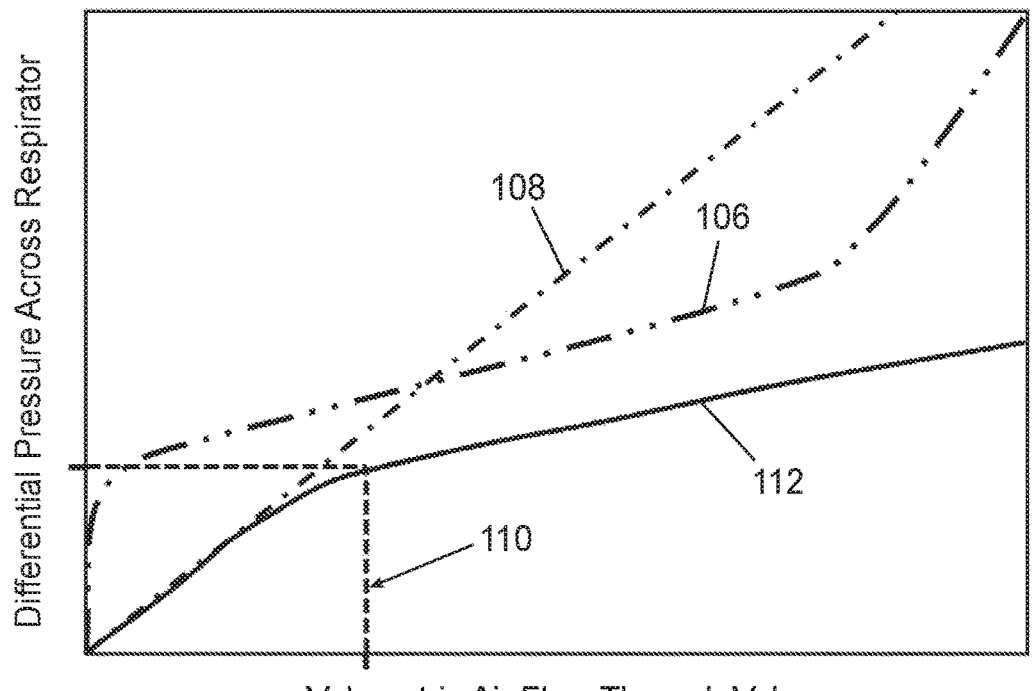
FIG. 13 is a graph of differential pressure across a typical respirator that includes an exhalation valve versus volumetric air flow through the respirator.

During exhalation through a face mask that includes an exhalation valve, the same or similar differential pressure can exist for the breathable layers of the face mask and for the valve. For example, FIG. 13 is a graph of differential pressure across a typical respirator that includes an exhalation valve versus a volumetric air flow through the respirator. A total exhalation flow 112 is the sum of the flow through the exhalation valve and the flow through the breathable layers of the face mask. At low differential pressures arising from low exhalation flow rates, little or no flow will pass through the valve if the differential pressure is lower than the valve opening pressure drop. Below exhalation flow rate 110, very little exhaled air exits through the exhalation valve.

In one or more embodiments, it may be beneficial to have a respirator exhalation valve with the lowest possible opening pressure drop and the lowest slope in the linear portion of the valve's pressure/flow relationship. This can result in the greatest amount of exhalation flow through the valve, thereby providing increased comfort for a face mask wearer.

FIG. 1 is a schematic perspective view of one embodiment of a filtering face mask 10. Filtering face mask 10 includes a cup-shaped mask body 12 onto which an exhalation valve 30 is attached. The valve 30 may be attached to the mask body using any suitable technique, including, for example, the techniques described in U.S. Pat. No. 6,125,849 to Williams et al. or in PCT Publication No. WO2001/28634 to Curran et al. The exhalation valve 30 opens in response to increased pressure inside the mask 10, where such increased pressure occurs when a wearer exhales. In one or more embodiments, the exhalation valve 30 remains closed between breaths and during inhalation.

Mask body 12 is adapted to fit over the nose and mouth of a wearer in spaced relation to the wearer's face to create an interior gas space or void between the wearer's face and the interior surface of the mask body. The mask body 12 can be fluid permeable and typically is provided with an opening (not shown) that is located where the exhalation valve 30 is attached to the mask body 12 so that exhaled air can exit the interior gas space through the valve without having to pass through the mask body 12. The opening provided for the valve 30 can be disposed in any suitable location on the mask body 12. In one or more embodiments, the opening is disposed directly in front of where the wearer's mouth would be when the mask 10 is being worn. The placement of the opening, and hence the exhalation valve 30, at this location allows the valve to open more easily in response to the exhalation pressure generated by the wearer of the mask 10. In one or more embodiments, essentially an entire exposed surface of mask body 12 is fluid permeable to inhaled air.

A nose clip 16 that includes a pliable dead soft band of metal such as aluminum can be provided on the mask body 12 to allow it to be shaped to hold the face mask 10 in a desired fitting relationship over the nose of the wearer. Any suitable nose clip 16 can be utilized with face mask 10, e.g., the nose clips described in U.S. Pat. No. 5,558,089 and Des. 412,573 to Castiglione.

Mask body 12 can have a curved, hemispherical shape as shown in FIG. 1 (see also U.S. Patent No. 4,807,619 to Dyrud et al.) or it may take on other shapes as so desired. For example, the mask body 12 can be a cup-shaped mask having a construction like the face mask disclosed in U.S. Pat. No. 4,827,924 to Japuntich. The face mask 10 can also have a three-panel configuration that can fold flat when not in use but can open into a cup-shaped configuration when worn. See, e.g., U.S. Pat. No. 6,123,077 to Bostock et al.; U.S. Patent Des. 431,647 to Henderson et al.; and U.S. Patent Des. 424,688 to Bryant et al. Respirators of the present disclosure can also take on many other configurations, such as flat bifold masks disclosed, e.g., in U.S. Pat. Des. 443,927 to Chen. The mask body 12 can also be fluid impermeable and have filter cartridges attached to it like the masks described in U.S. Pat. No. 5,062,421 to Burns et al. In addition, the mask body 12 can also be adapted for use with a positive pressure air intake as opposed to the negative pressure masks just described. Examples of positive pressure masks are described, e.g., in U.S. Pat. No. 5,924,420 to Grannis et al. and 4,790,306 to Braun et al. The mask body 12 of the face mask 10 can also be connected to a self-contained breathing apparatus, which supplies filtered air to the wearer as disclosed, e.g., in U.S. Pat. Nos. 5,035,239 and 4,971,052. The mask body 12 can be configured to cover not only the nose and mouth of the wearer (referred to as a "half mask") but may also cover the eyes (referred to as a "full face mask") to provide protection to a wearer's vision as well as to the wearer's respiratory system. See, e.g., U.S. Pat. No. 5,924,420 to Reischel et al. The mask body 12 may be spaced from the wearer's face, or it may reside flush or in close proximity to it. In either instance, the mask 10 helps define an interior gas space into which exhaled air passes before leaving the mask interior through the exhalation valve 30. The mask body 12 can also have a thermochromic fit-indicating seal at its periphery to allow the wearer to easily ascertain if a proper fit has been established. See U.S. Pat. No. 5,617,849 to Springett et al.

To hold the face mask 10 snugly upon the wearer's face, mask body 12 can include a harness such as straps 15, tie strings, or any other suitable device attached to it for supporting the mask on the wearer's face. Examples of mask harnesses that may be suitable are shown, e.g., in U.S. Pat. Nos. 5,394,568, and 6,062,221 to Brostrom et al.; and 5,464,010 to Byram.

Figure 2:
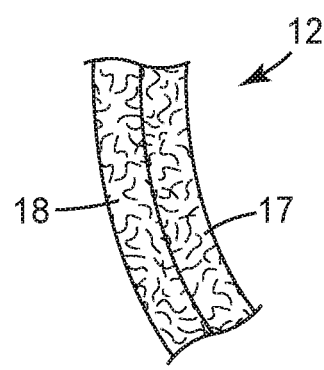
FIG. 2 is a schematic cross-section view of a portion of a mask body of the filtering face mask of FIG. 1.

FIG. 2 is a schematic cross-section view of a portion of the mask body 12 of FIG. 1. As shown in FIG. 2., the mask body 12 may include multiple layers such as an inner shaping layer 17 and an outer filtration layer 18. Shaping layer 17 provides structure to the mask body 12 and support for filtration layer 18. Shaping layer 17 may be located on the inside and/or outside of filtration layer 18 (or on both sides) and can be made, for example, from a nonwoven web of thermally-bondable fibers molded into a cup-shaped configuration. See, e.g., U.S. Pat. No. 4,807,619 to Dyrud et al.; and 4,536,440 to Berg. The shaping layer 17 can also be made from a porous layer or an open work "fishnet" type network of flexible plastic like the shaping layer disclosed in U.S. Pat. No. 4,850,347 to Skov. The shaping layer 17 can be molded in accordance with known procedures such as those described in Skov or in U.S. Pat. No. 5,307,796 to Kronzer et al. Although a shaping layer 17 is designed with the primary purpose of providing structure to the mask 10 and providing support for the filtration layer 18, the shaping layer can, for example, also act as a filter for capturing larger particles. Together layers 17 and 18 operate as an inhale filter element.

When a wearer inhales, air is drawn through the mask body 12, and airborne particles become captured by fibers, particularly the fibers in the filter layer 18. In the mask shown in FIG. 2, the filter layer 18 is integral with the mask body 12, i.e., it forms part of the mask body and is not an item that subsequently becomes attached to (or removed from) the mask body like a filter cartridge.

Filtering materials that are commonplace on negative pressure half mask respirators like the mask 10 shown in FIG. 1—often contain an entangled web of electrically charged microfibers, particularly meltblown microfibers (BMF). Microfibers typically have an average effective fiber diameter of about 20 micrometers (µm) or less, but commonly are about 1 to about 15 µm, and still more commonly about 3 to 10 µm in diameter. Effective fiber diameter may be calculated as described in Davies, C. N., *The Separation of Airborne Dust and Particles, Institution of Mechanical Engineers*, London, Proceedings 1B. 1952. BMF webs can be formed as described in Wente, Van A., *Superfine Thermoplastic Fibers in Industrial Engineering Chemistry*, vol. 48, pages 1342 et seq. (1956) or in Report No. 4364 of the Naval Research Laboratories, published May 25, 1954, entitled *Manufacture of Superfine Organic Fibers by Wente*, Van A., Boone, C. D., and Fluharty, E. L. When randomly entangled in a web, BMF webs can have sufficient integrity to be handled as a mat. Electric charge can be imparted to fibrous webs using techniques described, e.g., in U.S. Pat. No. 5,496,507 to Angadjivand et al.; 4,215,682 to Kubik et al.; and 4,592,815 to Nakao.

Examples of fibrous materials that may be used as filters in a mask body are disclosed in U.S. Pat. No. 5,706,804 to Baumann et al.; 4,419,993 to Peterson; Re 28,102 to Mayhew; U.S. Pat. Nos. 5,472,481 and 5,411,576 to Jones et al.; and 5,908,598 to Rousseau et al. The fibers may contain polymers such as polypropylene and/or poly-4-methyl-1-pentene (see, e.g., U.S. Pat. No. 4,874,399 to Jones et al.; and 6,057,256 to Dyrud et al.) and may also contain fluorine atoms and/or other additives to enhance filtration performance. See, e.g., U.S. patent application Ser. No. 09/109, 497, entitled FLUORINATED ELECTRET (published as PCT WO 00/01737), and U.S. Pat. Nos. 5,025,052 and 5,099,026 to Crater et al. The fibers may also have low levels of extractable hydrocarbons to improve performance. See, e.g., U.S. Pat. No. 6,213,122 to Rousseau et al. Fibrous webs may also be fabricated to have increased oily mist resistance as described in U.S. Pat. No. 4,874,399 to Reed et al.; and 6,238,466 and 6,068,799 to Rousseau et al.

The mask body 12 may also include inner and/or outer cover webs (not shown) that can protect the filter layer 18 from abrasive forces and that can retain any fibers that may come loose from the filter layer 18 and/or shaping layer 17. The cover webs may also have filtering abilities, although typically not nearly as good as the filtering layer 18 and/or may serve to make the mask more comfortable to wear. The cover webs may be made from nonwoven fibrous materials such as spun bonded fibers that contain, for example, polyolefins, and polyesters. See, e.g., U.S. Pat. No. 6,041, 782 to Angadjivand et al.; 4,807,619 to Dyrud et al.; and 4,536,440 to Berg.

Any suitable valve can be utilized with the filtering face mask 10 of FIG. 1. For example, FIGS. 3-9 are various views of the exhalation valve 30 of FIG. 1. The exhalation valve 30 includes a valve seat 40 and a valve flap 70. The valve seat 40 extends along a valve seat axis 32 between a first end 46 and a second end 48 of the valve seat. The valve seat 40 includes a first major surface 42, a second major surface 44, and an orifice 41 disposed between the first and second major surfaces. In one or more embodiments, the orifice 41 includes a substantially circular shape in a plane defined by the first major surface 42 of the valve seat 40. The valve seat 40 also includes a seal surface 50 and a flap retaining surface 56 disposed on the first major surface 42 of the valve seat. In one or more embodiments, the seal surface 50 circumscribes the orifice 41. Further, in one or more embodiments, the seal surface 50 circumscribes the orifice 41 and includes a substantially noncircular shape in the plane defined by the first major surface 42 of the valve seat 40. The exhalation valve 30 can also include a cover 80 (FIG. 9) connected to the valve seat 40 using any suitable technique or combination of techniques.

The valve flap 70 is disposed over the seal surface 50 and the orifice 41. Further, the valve flap 70 includes a first end 72 connected to the flap retaining surface 56. The valve flap 70 is adapted to be sealed against the seal surface 50 of the valve seat 40 when the exhalation valve 30 is disposed in a closed configuration (FIG. 3) such that fluid (e.g., gas) is prevented from flowing through the valve seat. The valve flap 70 also includes a second end 74 that is adapted to be spaced apart from the seal surface 50 when the exhalation valve 30 is disposed in an open configuration (FIG. 4) such that fluid can flow through the valve seat 50. In one or more embodiments, the valve flap 70 includes a curved shape in a plane orthogonal to the first major surface 42 of the valve seat 40 when the exhalation valve 30 is disposed in the closed configuration (FIG. 3).

The exhalation valve 30 can be connected to the filtering face mask 10 of FIG. 1 using any suitable technique or combination of techniques. For example, in one or more embodiments, an optional base connector 90 can be disposed on an inner surface of the face mask 10, and the valve seat 40 can be disposed on an outer surface of the face mask and connected to the optional base connector through the mask body 12.

The valve seat 40 can include any suitable material or combination of materials, e.g., metallic, polymeric, etc. Further, any suitable technique or combination of techniques can be utilized to form the valve seat 40. In one or more embodiments, the valve seat 40 can be made from a relatively lightweight plastic that is molded into an integral one-piece body. In one or more embodiments, the valve seat 40 can be made by injection molding techniques. Further, the valve seat 40 can take any suitable shape or combination of shapes and have any suitable dimensions. In one or more embodiments, the valve seat 40 can take a rectangular shape in the plane parallel to the first major surface 42.

The orifice 41 can be disposed radially inward from the seal surface 50. Further, the orifice 41 is disposed between the first major surface 42 and the second major surface 44 of the valve seat 40 and can take any suitable shape or combination of shapes in a plane defined by the first major surface 42 of the valve seat, e.g., elliptical, rectangular, polygonal, etc. In one or more embodiments, the orifice 41 can include a substantially circular shape. As used herein, the term "substantially circular shape" means that a perimeter 43 (FIG. 6) of the orifice 41 is a smooth and convex closed curve with a continuous first derivative and that the distance from all points on the perimeter from a common central point 2 (FIG. 6) vary by less than 5%. In one or more embodiments, the orifice 41 can include a circular shape. Further, the orifice 41 can have any suitable dimensions. In one or more embodiments, a minimum distance from any point on the perimeter 43 to the common central point 2 is at least 0.5 cm and no greater than 2.0 cm. The orifice 41 can be disposed in any suitable location on or through the valve seat 40.

In one or more embodiments, the valve seat 40 can include cross members 34 disposed within the orifice 41 that can stabilize the seal surface 50 and ultimately the valve 30. The cross members 34 can also prevent the valve flap 70 from inverting into orifice 41 during inhalation. Moisture build-up on the cross members 34 can hamper the opening of the flap 70. In one or more embodiments, the surfaces of the cross members 34 that face the flap 70 can be slightly recessed beneath the seal surface 50 when viewed from a side elevation to not hamper valve opening.

The seal surface 50 of the valve seat 40 can be disposed on the first major surface 42 using any suitable technique or combination of techniques. In one or more embodiments, the seal surface 50 is integral with the first major surface 42 of the valve seat 40. In one or more embodiments, the seal surface 50 can be manufactured separately and connected to the first major surface 42 using any suitable technique or combination of techniques. Further, the seal surface 50 can include any suitable material or combination of materials, e.g., the same materials described herein regarding the valve seat 40. In one or more embodiments, the seal surface 50 can include one or more materials that are different from the materials utilized to form the valve seat 50.

In one or more embodiments, the seal surface 50 can circumscribe the orifice 41 such that the seal surface completely surrounds the orifice in the plane defined by the first major surface 42 of the valve seat 40. In one or more embodiments, the seal surface 50 can partially surround the orifice 41.

Figure 6:
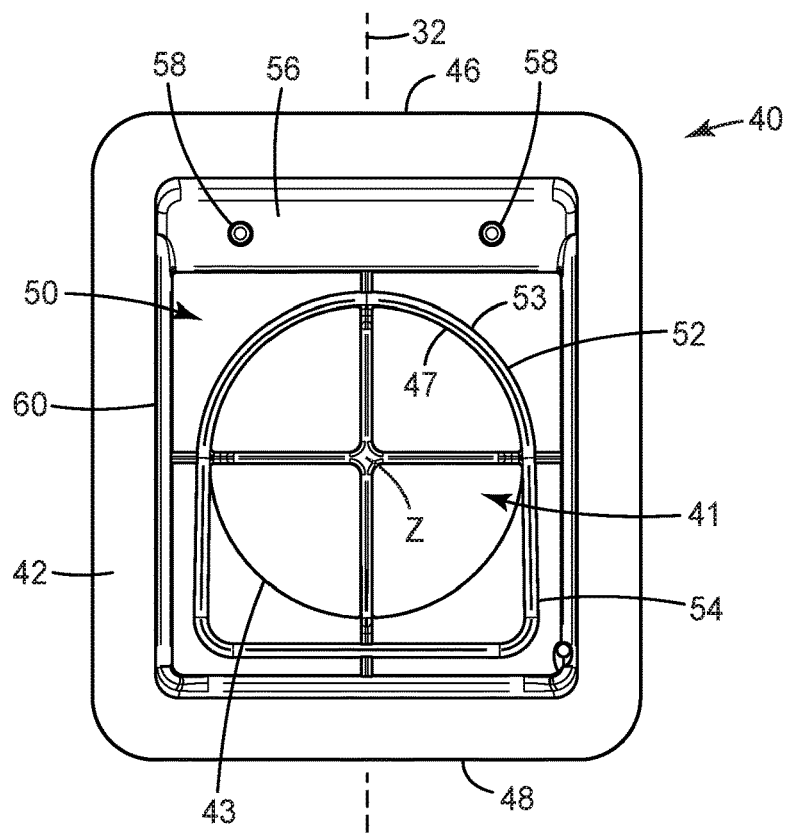
FIG. 6 is a schematic plan view of a first major surface of the valve seat of FIG. 5.
Figure 7:
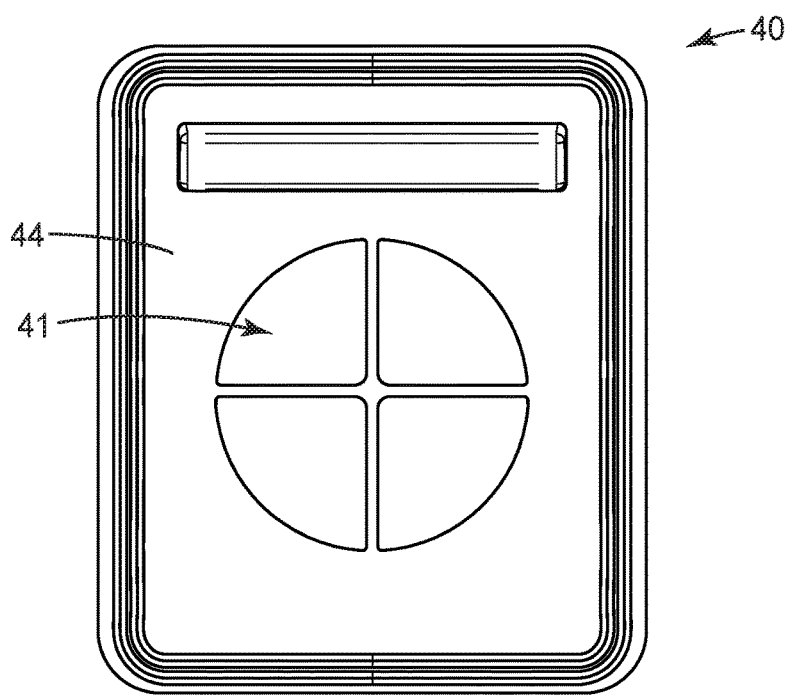
FIG. 7 is a schematic plan view of a second major surface of the valve seat of FIG. 4.

The seal surface 50 can take any suitable shape in the plane defined by the first major surface 42 of the valve seat 40, e.g., elliptical, rectangular, polygonal, etc. In one or more embodiments, the seal surface 50 can include a substantially noncircular shape. For example, in one or more embodiments, the seal surface 50 can include a trapezoidal portion 54 and an elliptical portion 52 connected to the trapezoidal portion as shown in FIG. 6 to provide a rounded trapezoidal shape. In one or more embodiments, the elliptical portion 52 can be substantially circular in shape. Further, in one or more embodiments, the trapezoidal portion 54 can be substantially rectangular in shape.

The seal surface 50 can be disposed in any suitable orientation relative to the flap retaining surface 56. In one or more embodiments, the elliptical portion 52 of the seal surface 50 is disposed adjacent the flap retaining surface 56. As used herein, the term "adjacent the flap retaining surface" means that the element or component is disposed closer to the flap retaining surface 56 than to the second end 48 of the valve seat 40.

As mentioned herein, the seal surface 50 can take any suitable shape in the plane defined by the first major surface 42 of the valve seat 40. Further, the seal surface 50 can take any suitable shape in a plane orthogonal to the first major surface 42 of the valve seat 40. For example, as can be seen in FIG. 3, the seal surface 50 has a concave shape in the plane orthogonal to the first major surface 42 of the valve seat 40. In one or more embodiments, the seal surface 50 can include a non-constant height as measured in a direction normal to the first major surface 42 of the valve seat 40 as is shown in FIG. 4. For example, a first portion 55 of the seal surface 50 adjacent the flap retaining surface 56 has a height 34 that is greater than a height 36 of a second portion 57 of the seal surface that is disposed between a first end 33 and a second end 35 of the seal surface. The first end 33 of the seal surface 50 is adjacent to the first end 46 of the valve seat 40, and the second end 35 of the seal surface 50 is adjacent to the second end 48 of the valve seat 40. As used herein, the phrase "adjacent to the first end 46 of the valve seat 40" means that the element or component is disposed closer to the first end 33 of the valve seat 40 than to the second end 35 of the valve seat 40. Similarly, the phrase "adjacent to the second end 48 of the valve seat 40" means that the element or component is disposed closer to the second end 35 of the valve seat 40 than to the first end 33 of the valve seat 40. In general, any suitable portions of the seal surface 50 can have any suitable height as measured from the first major surface 42 of the valve seat 40.

An area of the orifice 41 in the plane defined by the first major surface 42 of the valve seat 40 can have any suitable first area. Further, the seal surface 50 can enclose any suitable second area in the plane defined by the first major surface 42 of the valve seat 40. In one or more embodiments, the first area of the orifice 41 is less than the second area of the seal surface 50.

The orifice 41 can be disposed in any suitable relationship relative to the seal surface 50. For example, the perimeter 43 of the orifice 41 can be spaced apart from the seal surface 50 any suitable distance as measured along the first major surface 42 of the valve seat 40. For example, in one or more embodiments, the perimeter 43 of the orifice 41 is spaced apart from the seal surface 50 a distance that is no greater than 0.5 cm. In one or more embodiments, a portion of the perimeter 43 of the orifice 41 can be spaced apart from a portion of the seal surface 50 a distance 38 (FIG. 6) as measured along the first major surface 42 of the valve seat 40 that is equal to at least 0.1 cm. In one or more embodiments, one or more portions of the perimeter 43, through the orifice 41 can be coincident with the seal surface 50 as measured along the first major surface 42 of the valve seat 40. As used herein, the term "coincident" means that a portion or portions of the perimeter 43 of the orifice 41 follows a shape of the seal surface 50 such that there is no distance or space between portions of the perimeter 43 and the seal surface 50. For example, as shown in FIG. 6, portion 47 of perimeter 43 is coincident with portion 53 of seal surface 50. Any suitable percentage of the perimeter 43 of the orifice 41 can be coincident with the seal surface 50 as measured along the first major surface 42 of the valve seat 40. In one or more embodiments, no greater than 75% of the perimeter 43 of the orifice 41 is coincident with the seal surface 50. In one or more embodiments, no greater than 50% of the perimeter 43 of the orifice 41 is coincident with the seal surface 50. Further, in one or more embodiments, no greater than 25% of the perimeter 43 of the orifice 41 is coincident with the seal surface 50. Further, in one or more embodiments, no greater than 10% of the perimeter 43 is coincident with the seal surface 50.

The seal surface 50 that makes contact with the flap 70 can be formed to be substantially uniformly smooth to ensure that a good seal occurs and may reside on the top of the surface. The seal surface 50 can have a width great enough to form a seal with the valve flap 70 but is not so wide as to allow adhesive forces caused by condensed moisture to make the flap significantly more difficult to open. In one or more embodiments, a width of the seal surface 50 can be at least 0.2 mm and no greater than 0.5 mm.

The valve flap 70 is disposed over the seal surface 50 and the orifice 41. The valve flap 70 includes the first end 72 connected to the flap retaining surface 56 using any suitable technique or combination of techniques. In one or more embodiments, the flap retaining surface 56 can include one or more posts 58 that are adapted to engage openings 76 of the valve flap 70 that are disposed adjacent the first end 72 of the flap. Further, the valve flap 70 can be secured to the surface 56, e.g., using sonic welding, an adhesive, mechanical clamping, etc.

Further, the valve flap 70 includes the second end 74 that is adapted to be spaced apart from the seal surface 50 when the exhalation valve 30 is disposed in an open configuration as shown in FIG. 4 such that fluid (e.g. gas) can flow through the valve seat 40. In one or more embodiments, the flap 70 lifts from the seal surface 50 at its free end 74 when a significant pressure is reached in the interior gas space of the face mask 10 during an exhalation. As described herein, the seal surface 50 can be adapted to generally curve in a direction parallel to the valve seat axis 32 such that it has a concave cross-section when viewed from a side elevation and may be non-aligned and relatively positioned with respect to a flap retaining surface 56 to allow the flap to be biased or pressed towards the seal surface under neutral conditions, i.e., when the wearer is neither inhaling or exhaling. The flap 70 can also have a transverse curvature imparted to it as described, e.g., in U.S. Pat. No. 5,687,767, reissued as Re 37,974 to Bowers.

The valve flap 70 is adapted to be sealed against the seal surface 50 of the valve seat 40 when the exhalation valve 30 is disposed in the close configuration as shown in FIG. 3 such that fluid is prevented from flowing through the valve seat 40. In one or more embodiments, the valve flap 70 can include a curved shape in a plane orthogonal to the first major surface 42 of the valve seat 40 when the exhalation valve 30 is disposed in the closed configuration as shown in FIG. 3.

Figure 8:
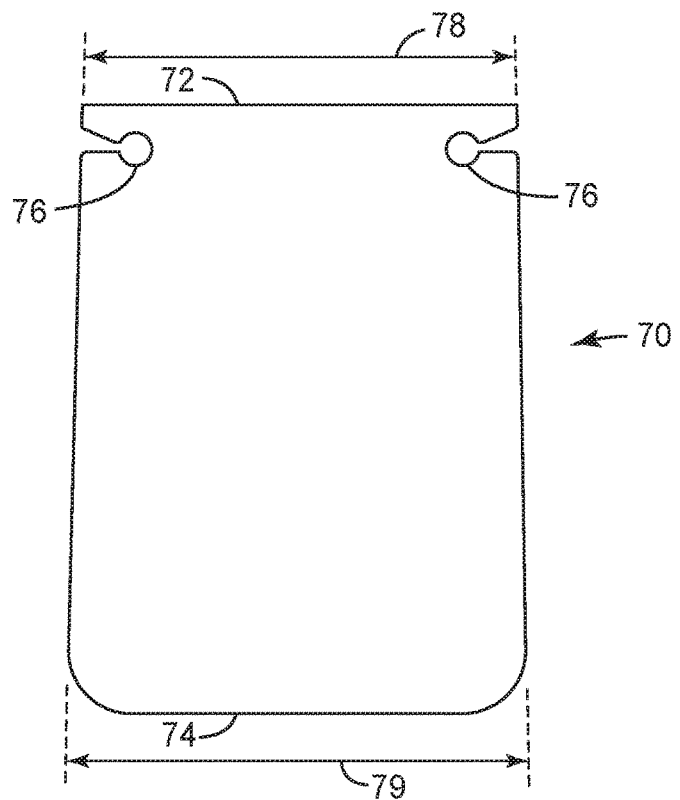
FIG. 8 is a schematic plan view of a valve flap of the exhalation valve of FIG. 1.

The valve flap 70 can take any suitable shape or combination of shapes in a plane defined by the first major surface 42 of the valve seat 40. For example, as shown in FIG. 8, in one or more embodiments, a width 78 of the first end 72 of the valve flap 70 is less than a width 79 of the second end 74 the valve flap as measured along a direction orthogonal to the valve seat axis 32 when the flap is connected to the flap retaining surface 56. In one or more embodiments, the width 78 of the first end 72 is greater than the width 79 of the second end 74 the valve flap 70. The valve flap 70 can take any suitable shape or combination of shapes in the plane shown in FIG. 8, e.g., elliptical, rectangular, polygonal, etc. In one or more embodiments, the valve flap 70 can include a shape in the plane defined by the first major surface 42 of the valve seat 40 that corresponds to the shape of the seal surface 50 in the same plane. As used herein, the term "corresponds" means that the shape of the valve flap 70 is substantially the same as the shape of the seal surface 50 but can have differing overall dimensions, e.g., the shape and dimensions of the valve flap can be selected such that the valve flap covers the seal surface when in the closed configuration.

The first end 72 of the valve flap 70 is connected to the flap retaining surface 56, which can, in one or more embodiments, be substantially disposed in a plane 81 that forms an angle 31 with the valve seat axis 32 as is shown in FIG. 4. Angle 31 can have any suitable value. In one or more embodiments, angle 31 can be greater than 0 degrees such that the valve flap 70 is cantilevered in relation to the first major surface 42 of the valve seat 40. This cantilevered arrangement of the flap retaining surface 56 can provide the flap 70 with a curved shape in the plane orthogonal to the first major surface 42 of the valve seat 40 as shown in FIG. 3.

The valve flap 70 can include any suitable material or combination of materials, e.g., metallic, polymeric, etc. Further, the valve flap 70 can include a single layer of material. In one or more embodiments, the valve flap 70 can include two more layers of material as described, e.g. in U.S. Pat. No. 7,028,689 to Martin et al. entitled FILTERING FACE MASK THAT USES AN EXHALATION VALVE THAT HAS A MULTILAYERED FLEXIBLE FLAP. In one or more embodiments, the valve flap 70 can include a multilayer optical film as is also described in U.S. Pat. No. 7,028,689. The valve flap 70 can include any suitable coating or coatings. Such coatings can, in one or more embodiments, promote a good seal between the valve flap 70 and the seal surface 50. Suitable coatings can include elastomers, both thermoset and thermoplastic, and thermoplastic/plastomers. Elastomers, which may be either thermoplastic elastomers or crosslinked rubbers, may include rubber materials such as polyisoprene, poly(styrene-butadiene) rubber, polybutadiene, butyl rubber, ethylene-propylene-diene rubber, ethylene-propylene rubber, nitrile rubber, polychloroprene rubber, chlorinated polyethylene rubber, chlorosulphonated polyethylene rubber, polyacrylate elastomer, ethylene-acrylic rubber, fluorine containing elastomers, silicone rubber, polyurethane, epichlorohydrin rubber, propylene oxide rubber, polysulphide rubber, polyphosphazene rubber, and latex rubber, styrene-butadiene-styrene block copolymer elastomer, styrene-ethylene/butylene-styrene block copolymer elastomer, styrene-isoprene-styrene block copolymer elastomer, ultra-low density polyethylene elastomer, copolyester ether elastomer, ethylene methyl acrylate elastomer ethylene vinyl acetate elastomer, and polyalphaolefin elastomers. Blends or mixtures of these materials may also be used.

Figure 9:
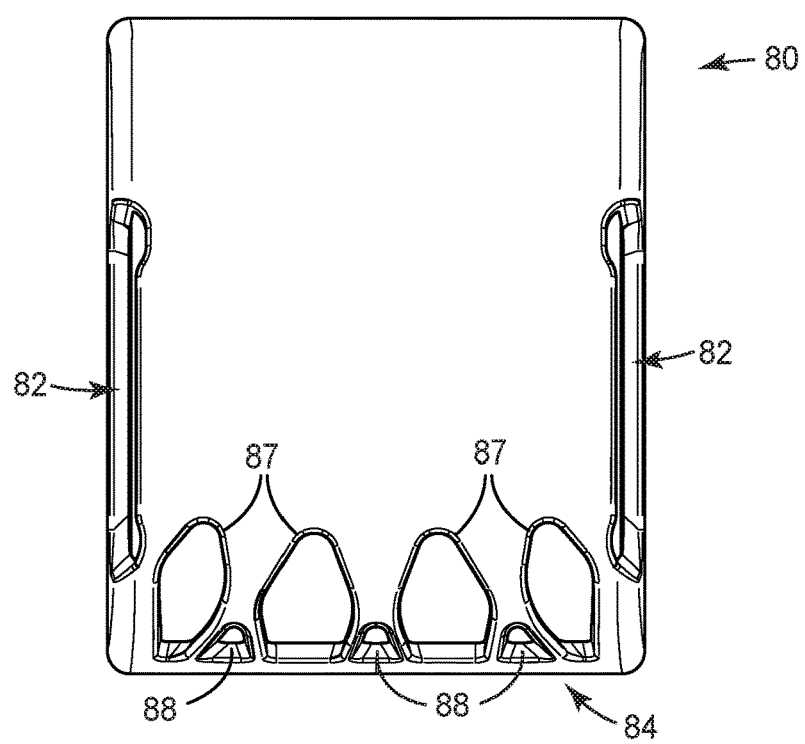
FIG. 9 is a schematic plan view of a cover of the exhalation valve of FIG. 1.

In one or more embodiments, the exhalation valve 30 can include a cover 80 (FIG. 9). The cover 80 can be connected to the valve seat 40 using any suitable technique or combination of techniques. For example, the valve seat 40 can include a cover retaining surface 60 that extends from the first major surface 42 of the valve seat 40 (FIGS. 5-6). The cover retaining surface 60 can take any suitable shape or combination of shapes. Further, the cover retaining surface 60 can have any suitable dimensions. The cover retaining surface 60 can be integral with the first major surface 42 of the valve seat 40. In one or more embodiments, the cover retaining surface 60 can be manufactured separately and attached to the first major surface 42 of the valve seat 40 using any suitable technique or combination of techniques. In one or more embodiments, the valve cover 80 is press fit onto the valve seat 40 such that a friction fit is formed between the cover retaining surface 60 and an interior surface of the valve cover 80.

The valve cover 80 is adapted to be connected to the valve seat 40 and disposed over the valve flap 70 and at least a portion of the first major surface 42 of the valve seat 40. In one or more embodiments, the valve cover 80 can include an opening or openings in fluid communication with the orifice 41 when exhalation valve 30 is disposed in the open configuration as shown in FIG. 4. For example, as illustrated in FIG. 9, the valve cover 80 includes side openings 82 and front openings 84. The side openings 82 and the front openings 84 can take any suitable shape or combination of shapes. In one or more embodiments, the side openings 82 take the same shape as the front openings 84. In one or more embodiments, the shape of the side openings 82 is different from the shape of the front openings 84. Further, the front openings 84 can have the same shape or different shapes. For example, front openings 84 include large openings 87 and small openings 88 disposed between the large openings. The side and front openings 82, 84 can have any suitable dimensions.

The cover 80 can take any suitable shape in the plane defined by the first major surface 42 of the valve seat 40. Further, the cover 80 can take any suitable shape or combination of shapes in a plane orthogonal to the first major surface 42. For example, as shown in FIGS. 3-4, the valve cover 80 can take a curved shape that has a height measured in a direction orthogonal to the first major surface 42 of the valve seat 40 that varies in a direction between the first end 46 and the second end 48 of the valve seat.

In one or more embodiments, the cover 80 can include a surface 86 that is adapted to engage the flap 70 such that the flap is retained against the flap retaining surface 56 of the valve seat 40. Further, the cover 80 can include one or more flap stops 83 disposed on an inner surface 85 of the valve cover. The flap stops 83 can take any suitable shape or combination of shapes and be located in any suitable location on the inner surface 85 of the valve cover 80. In one or more embodiments, the flap stops 83 are adapted to engage the second end 74 of the valve flap 70 when the exhalation valve 30 is in the open configuration to prevent the valve flap from becoming completely engaged with the inner surface 85 of the cover, where such engagement with the inner surface may prevent the valve flap from returning to the closed configuration. In one or more embodiments, such engagement between the valve flap 70 and the inner surface 85 of the cover 80 can be caused by moisture that forms on one or both of the valve flap and the cover.

When the wearer of the filtering face mask 10 exhales, the exhaled air commonly passes through both the mask body 12 and the exhalation valve 30. Comfort can be improved when the highest percentage of the exhaled air passes through the exhalation valve 30, as opposed to the filter media and/or shaping and cover layers of the mask body 12. Exhaled air is expelled from the interior gas space through the orifice 41 of the valve 30 by having the exhaled air lift the valve flap 70 from the seal surface 50. The fluid that passes through the orifice 41 exerts a force on the flap 70, causing the free end 74 of the flap to be lifted from seal surface 50 to make the valve 30 open. When valve 30 is used as an exhalation valve, the valve can be oriented on face mask 10 such that the free end 74 of flap 70 is located below the secured end when the mask 10 is positioned upright as shown in FIG. 1. This enables exhaled air to be deflected downwards to prevent moisture from condensing on the wearer's eyewear.

In general, the various embodiments of exhalation valves described herein can provide any desired valve of pressure drop. The pressure drop may be determined in accordance with the Pressure Drop Test set forth herein. At flow rates of 10 L/min, multi-layered flexible flaps may enable the inventive unidirectional fluid valve to have a pressure drop of less than 30 Pa, preferably less than 25 Pa, and more preferably less than 20 Pa. Pressure drops of about 5 to 50 Pa may be obtainable between flow rates of 10 L/min and 85 L/min using multi-layer flexible flaps in accordance with the present invention. In one or more embodiments, the pressure drop may be less than 25 Pa over flow rates of 10 L/min to 85 L/min.

The valve opening pressure drop measures the resistance to the initial lifting of the flap from the valve's seal surface. This parameter may be determined as described below in the Pressure Drop Test. Typically, the valve opening pressure drop at 10 L/min is less than 30 Pa, preferably less than 25 Pa, and more preferably less than 20 Pa when testing a valve in accordance with the Pressure Drop Test described below. Typically, the valve opening pressure drop is about 5 to 30 Pa at 10 L/min when testing a valve in accordance with the Pressure Drop Test described below.

Example

Prototype valve seats were provided utilizing stereolithography (SLA) rapid prototyping. The overall valve size was similar to the existing valve sold under the trade designation "CoolFlow" (available from 3M Company, Et. Paul, MN, and utilized in respirators sold under the trade designation "Particulate Respirator 8511," also available from 3M Company). The valve seats are listed in Table 1 below. The "rounded trapezoid" shape refers to the shape of the sealing surface 56 as illustrated in FIG. 6. Example 2 was created by attaching a sheet of plastic with a round hole similar in size and position to the orifice in the Comparative Example 1.

TABLE 1

Prototype valve seat descriptions

| Valve Seats | Sealing Surface Shape | Orifice Shape |
|---|---|---|
| Comparative Example 1 | Round | Round |
| Comparative Example 2 | Rounded Trapezoid | Rounded Trapezoid |
| Example | Rounded Trapezoid | Round |

The Comparative Examples 1-2 and the Example were used to assemble exhalation valves that included valve flaps and covers. The valve flaps were composed of 0.05 mm thick multilayer optical film coated on one side with a 0.05 mm thick coating of SBS rubber (available from Dexco Polymers, Plaquemine, LA, USA). When assembled, the coated side of the valve flap was placed against a sealing surface of each of the valve seats.

Pressure Drop Test

The samples were tested on a pressure/flow test system composed of a 50 L/min electronic flow controller (available from MKS Instruments, Andover, MA), high resolution differential pressure transducer (available from Omega Engineering Inc., Stamford, CT), a valve test fixture and a personal computer running Windows 7 operating system. Compressed air was supplied to the flow controller at approximately 250 kPa, and the flow controller was attached the test fixture. The pressure transducer was attached to the test fixture to measure the differential pressure between the upstream and downstream sides of the valve installed in the test fixture. The computer ran a test program that controlled the flow controller and acquired measured flow and differential pressure data using a data acquisition interface (National Instruments Corporation, Austin, TX, USA).

Each valve sample was tested at approximate flow rates of 2, 6, 10, 14, 18, 22, 26, and 30 L/min for 15 seconds at each flow rate. The acquired data for flow and differential pressure were analyzed in an Excel spreadsheet by fitting the data to a straight line via linear regression using differential pressure as the dependent variable and flow rate as the independent variable. The y-axis intercept of the linear regression represented the opening differential pressure of each tested valve. Table 2 shows the results of the testing.

TABLE 2

Opening Differential Pressure

| Valve | Opening Differential Pressure (Pa) |
|---|---|
| Comparative Example 1 | 9.1 |
| Comparative Example 2 | 5.7 |
| Example | 6.1 |

The Example had a significantly lower opening differential pressure than that of Comparative Example 1. While not wishing to be bound by any particular theory, this difference in pressure can be caused by a greater moment arm of the valve flap on the extended "rounded trapezoid" sealing surface of the Example. Comparative Example 2 had an opening differential pressure that was slightly lower than the Example because Comparative Sample has the same "rounded trapezoid" sealing surface as the Example. The presence of the rounded orifice in the Example increased the opening differential pressure by 0.4 Pa, or 7%, which is small compared to the increase in Comparative Example 1 of 3.4 Pa, or 60%. The combination of the round orifice and rounded trapezoid sealing surface of the Example provided most of the improvement in opening differential pressure over Comparative Example 2 while providing the manufacturing advantages of the rounded orifice.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the 10 illustrative embodiments set forth herein. Accordingly, the disclosure is to be limited only by the claims provided below.

What is claimed is:

1. An exhalation valve, comprising:
    a valve seat comprising a first major surface, a second major surface, an orifice disposed between the first and second major surfaces of the valve seat, and a valve seat axis extending between a first end and a second end of the valve seat, wherein the orifice comprises a substantially circular shape in a plane defined by the first major surface of the valve seat, wherein the valve seat further comprises a seal surface and a flap retaining surface each disposed on the first major surface of the valve seat, wherein the seal surface circumscribes the orifice and comprises a substantially noncircular shape in the plane defined by the first major surface of the valve seat, wherein noncircular means not having the form of a circle, and wherein the seal surface comprises a trapezoidal portion and an elliptical portion connected to the trapezoidal portion, wherein the elliptical portion is disposed adjacent to the flap retaining surface; and
    a valve flap disposed over the seal surface and the orifice and comprising a first end connected to the flap retaining surface, wherein the valve flap is adapted to be sealed against the seal surface of the valve seat when the exhalation valve is disposed in a closed configuration such that fluid is prevented from flowing through the valve seat, wherein a second end of the valve flap is adapted to be spaced apart from the seal surface when the exhalation valve is disposed in an open configuration such that fluid can flow through the valve seat, and further wherein the valve flap comprises a curved shape in a plane orthogonal to the first major surface of the valve seat when the exhalation valve is disposed in the closed configuration;
    wherein one or more portions of a perimeter through the orifice are coincident with the seal surface as measured along the first major surface of the valve seat;
    wherein no greater than 75% of the perimeter of the orifice is coincident with the seal surface as measured in the plane defined by the first major surface of the valve seat;
    wherein a pressure differential required to open the exhalation valve is minimized.

2. The exhalation valve of claim 1, wherein the second end of the valve flap is sealed against the trapezoidal portion of the seal surface when the exhalation valve is disposed in the closed configuration.

3. The exhalation valve of claim 2, wherein a width of the first end of the valve flap is less than a width of the second end of the valve flap as measured along a direction orthogonal to the valve seat axis.

4. The exhalation valve claim 1, further comprising a valve cover adapted to be connected to the valve seat and disposed over the valve flap and at least a portion of the first major surface of the valve seat.

5. The exhalation valve of claim 4, wherein the valve cover comprises an opening in fluid communication with the orifice when the exhalation valve is disposed in the open configuration.

6. The exhalation valve of claim 1, wherein a perimeter of the orifice is spaced apart from the seal surface a distance that is no greater than 0.5 cm as measured along the first major surface of the valve seat.

7. The exhalation valve of claim 6, wherein a portion of the perimeter of the orifice is spaced apart from a portion of the seal surface a distance that is equal to 0.1 cm as measured along the first major surface of the valve seat.

8. The exhalation valve of claim 1, wherein the seal surface comprises a nonconstant height as measured in a direction normal to the first major surface of the valve seat.

9. The exhalation valve of claim 8, wherein a height of a first portion of the seal surface adjacent to the flap retaining surface is greater than a height of a second portion of the seal surface disposed between a first end and a second end of the seal surface, wherein the first end of the seal surface is adjacent to the first end of the valve seat and the second end of the seal surface is adjacent to the second end of the valve seat.

10. The exhalation valve of claim 1, wherein the valve flap comprises two or more layers.

11. The exhalation valve of claim 10, wherein the valve flap further comprises an elastomer coating.

12. The exhalation valve of claim 1, wherein the flap retaining surface is disposed adjacent to the first end of the valve seat.

13. The exhalation valve of claim 1, wherein the flap retaining surface is substantially disposed in a first plane that forms an angle with the valve seat axis that is greater than 0.

14. The exhalation valve of claim 1, wherein the orifice comprises a first area in the plane defined by the first major surface of the valve seat, wherein the seal surface comprises a second area in the plane defined by the first major surface, wherein the first area is less than the second area.

15. The exhalation valve of claim 1, wherein no greater than 25% of the perimeter of the orifice is coincident with the seal surface as measured in the plane defined by the first major surface of the valve seat.

16. The exhalation valve of claim 1, wherein the seal surface comprises a concave shape in a plane orthogonal to the first major surface of the valve seat.

17. The exhalation valve of claim 1, wherein the valve flap comprises a multilayer optical film.

18. A filtering face mask, comprising:
- a mask body adapted to fit at least over the nose and mouth of a wearer to form an interior gas space when worn; and
- the exhalation valve of claim 1, wherein the exhalation valve is in fluid communication with the interior gas space.

* * * * *